United States Patent [19]

Cressman

[11] Patent Number: 5,015,066
[45] Date of Patent: May 14, 1991

[54] MULTICHANNEL WAVEGUIDE PRINT HEAD WITH SYMMETRIC OUTPUT
[75] Inventor: Paul J. Cressman, Rochester, N.Y.
[73] Assignee: Eastman Kodak Company, Rochester, N.Y.
[21] Appl. No.: 529,303
[22] Filed: May 29, 1990
[51] Int. Cl.$^5$ .................... G02B 6/08; G02B 27/00
[52] U.S. Cl. ........................... 350/96.27; 355/1
[58] Field of Search ... 355/1; 350/96.10, 96.12–96.14, 350/96.27

[56] References Cited

U.S. PATENT DOCUMENTS

| | | | |
|---|---|---|---|
| 3,614,198 | 10/1971 | Martin et al. | 350/96 |
| 3,841,733 | 10/1974 | Ebersole | 350/160 R |
| 4,217,032 | 8/1980 | Sheem | 350/96.21 |
| 4,389,655 | 6/1983 | Baues | 346/107 R |
| 4,466,696 | 8/1984 | Carney | 350/96.20 |
| 4,639,074 | 1/1987 | Murphy | 350/96.15 |
| 4,709,978 | 12/1987 | Jackel | 350/96.14 |
| 4,816,912 | 3/1989 | Suzuki et al. | 358/300 |
| 4,824,747 | 4/1989 | Andrews | 430/1 |
| 4,878,727 | 11/1989 | Boiarski et al. | 350/96.17 |
| 4,886,538 | 12/1989 | Mahapatra | 65/30.13 |
| 4,897,671 | 1/1990 | Mahapatra et al. | 350/96.12 |
| 4,900,130 | 2/1990 | Haas | 350/321 |
| 4,929,965 | 5/1990 | Fuse | 350/96.27 X |

FOREIGN PATENT DOCUMENTS

| | | | |
|---|---|---|---|
| 53-76048 | 7/1978 | Japan | 350/96.34 |
| 54-34781 | 11/1979 | Japan | 350/96.34 |
| 63-96604 | 4/1988 | Japan | |

OTHER PUBLICATIONS

R. T. Lynch, Jr.; "Optical Fiber-Waveguide Coupler"; Mar. 1979; IBM Technical Disclosure Bulletin; vol. 21, No. 10, p. 4287.
H. Blauvelt et al.; "AlGaAs Lasers with Micro--Cleaved Mirrors Suitable for Monolithic Integration"; Nov. 9, 1981; pp. 289–290; PACS numbers 42.55. Px.
J. Noda et al.; "Effect of Mg Diffusion on Ti-Diffused LiNbO$_3$ Waveguides"; Feb. 7, 1978; pp. 3150–3154; PACS numbers 42.80. Lt, 66.30.Jt.
M. J. Brady; "Fabrication Processes for a Silicon Substrate Package for Integrated Gallium Arsenide Laser Arrays"; Oct. 1978; pp. 1642–1647.
H. P. Hsu et al.; "Flip-Chip Approach to Endfire Coupling Between Single-Mode Electronic Letters; Optical Fibres and Channel Waveguides"; Jul. 5, 1976; vol. 12, No. 16, pp. 404–405.
Janet L. Jackel et al.; "Nonsymmetric Mach-Zehnder Interferometers Used as Low-Drive-Voltage Modulators"; Journal of Lightwave Technology, vol. 6, No. 8; Aug. 1988; pp. 1348–1349.
C. M. Gee et al.; "Traveling-Wave Electrooptic Modulator"; Applied Optics, vol. 22, No. 13, pp. 2034–2037; Jul. 1, 1983.
J. T. Boyd et al.; "Optical Coupling from Fibers to Channel Waveguides Formed on Silicon"; Applied Optics; Mar. 15, 1978; vol. 17, No. 6, pp. 895–898.
T. Findakly et al.; "Optical Directional Couplers with Variable Spacing"; Applied Optics; Mar. 1, 1978; vol. 17, No. 5, pp. 769–773.
J. Lipson et al.; "A Six-Channel Wavelength Multiplexer and Demultiplexer for Journal of Lightwave Technology; Oct. 1985; Single Mode Systems"; vol. LT-3, No. 5, pp. 1159–1162.
L. P. Bolvin; "Thin-Film Laser-to-Fiber Coupler"; Applied Optics; Feb. 1974; vol. 13, No. 2, pp. 391–395.

Primary Examiner—Akm Ullah
Attorney, Agent, or Firm—Edward Dugas

[57] ABSTRACT

In a preferred embodiment of the present invention there is provided a substrate having formed therein a plurality of optical waveguides. The waveguides are formed in a fanned out pattern with each alternate waveguide having a different width. At the fanned out ends of each of the waveguides there is coupled an optical fiber for transmitting light to the optical waveguide. In another embodiment of the invention, a substrate block is formed of glass, plastic, or X-cut LiNbO$_3$ material and each waveguide in LiNbO$_3$ is formed by diffusing strips of Ti or other suitable optical waveguide material into the substrate in a desired fan pattern and by forming an overcoat with a material, such as MgO for LiNbO$_3$, which has an index of refraction that causes the output beam to be symmetrically formed. In yet another embodiment of the invention each of the optical waveguides is formed with a narrow width portion and a wide width portion with the narrow width portions of each of the waveguides being adjacent the wide width portions of a neighboring waveguide.

6 Claims, 3 Drawing Sheets

FIG. 2
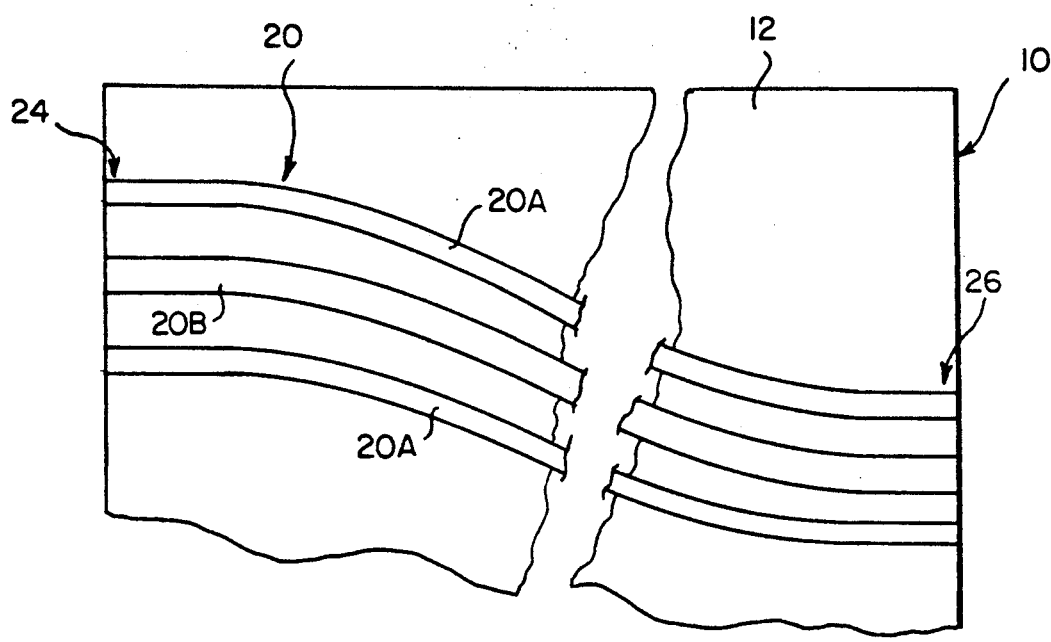
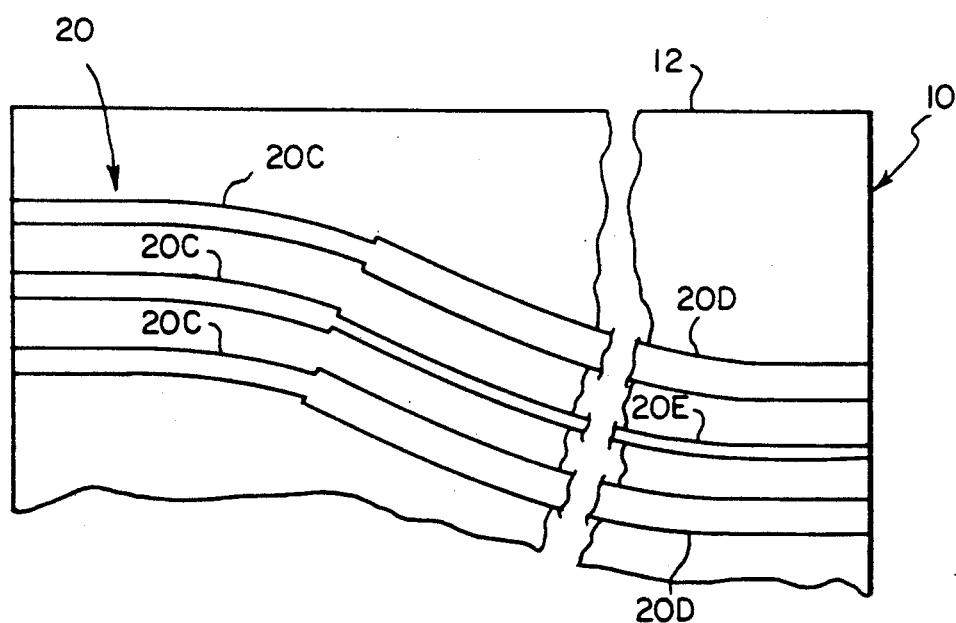
FIG. 3

MULTICHANNEL WAVEGUIDE PRINT HEAD WITH SYMMETRIC OUTPUT

BACKGROUND OF THE INVENTION

1. Field of The Invention

The present invention is directed to an optical print head of the type that utilizes optical fibers and a light source to record images and text onto a recording medium, and more particularly to an improved optical print head which utilizes optical fibers coupled to closely positioned optical waveguides for improving the speed of recording.

2. State of The Prior Art

One method of increasing the writing speed of an optical printing system is to increase the number of channels used to transfer information onto the recording medium and to have them write in parallel. If for some reason the channels cannot be separated by the desired distance, the print head containing the channels can be tilted at an angle and the electronic signals modulating the light to the channels delayed by the amount needed to compensate for the tilt. Large tilt angles are needed if the spacing between the channels is too large and the accurate setting of the print head then becomes difficult.

A patent of interest for its teaching is U.S. Pat. No. 4,389,655, entitled "Optical Device For Non-Contact Recording And Particular Facsimile Reproduction Of Images And Test" by P. Baues. In that patent, optical fibers are held in close proximity by the use of grooves in a supporting structure. Another approach for decreasing the spacing between each printing element is to form the printing elements from a fanned out plurality of closely spaced optical waveguides. The fanned out end of each of the waveguides is connected to an individual optical fiber. The opposite ends of the waveguides are closely positioned, at distances which are smaller than the diameters of the optical fibers. Such a structure is suggested in FIG. 4 of a paper by J. T. Boyd and S. Sriram entitled "Optical Coupling from Fibers to Channel Waveguides formed on Silicon" Mar. 15, 1978/ Vol. 17, No. 6/Applied Optics.

A number of problems occur when channel waveguides are used in a print head, particularly when optical waveguides are formed in substrate mediums such as glass, plastic or LiNbO$_3$ with each optical waveguide positioned in close proximity to its neighbor. One of the problems is that the Gaussian distribution of the intensity of the light from the end of the waveguide is skewed in a direction perpendicular to the surface of the waveguide. This is caused by the presence of the material forming the optical waveguides such as Ti which increases the index of refraction at its location. The index of refraction then decreases monotonically from a maximum at the surface to a bulk value (associated with the particular medium used) at a distance of several microns below the surface. This causes the optical beam, formed on the recording medium in this direction, to take on a skewed gaussian shape when in fact a symmetric gaussian shape is preferred. A second problem is cross talk which occurs because the elements forming the optical waveguide are close to each other.

The first problem, namely the one caused by the difference in the index of refraction of the materials used to form the print head may be minimized when using LiNbO$_3$ by diffusing a thin layer of MgO over the Ti. A paper which addresses a solution to this problem is authored by J. Noda et al and is entitled "Effect of Mg Diffusion on Ti-diffused LiNbO$_3$ Waveguides", J. Appl. Phys., Vol. 49, No. 6, June 1978.

A suggestion of a solution to the second problem is set out in a paper authored by J. L. Jackel et al, and entitled "Nonsymmetric Mach-Zehnder Interferometers Used as Low-Drive-Voltage Modulators". In that paper it is stated that optical decoupling of the waveguides may be effected by differing the propagation constants of the two guides. One method for accomplishing this difference is to provide different widths for each waveguide.

In order to provide an optical head having multiple waveguide channels it is necessary to address and to solve the aforementioned problems.

SUMMARY OF THE INVENTION

In a preferred embodiment of the present invention there is provided a substrate, preferably of glass, having formed therein a plurality of optical waveguides. The waveguides are formed, by an ion exchange process for example, in a fanned out pattern with each alternate waveguide having a different width. At the fanned out ends of each of the waveguides there is coupled an optical fiber for transmitting light to the optical waveguide. In another embodiment of the invention, the substrate is formed of LiNbO$_3$ and each waveguide is formed by diffusing strips of Ti into the substrate in a desired fan pattern and by forming an overcoat of MgO over the diffused strips so as to provide an output beam of light from the non-fanned end of the waveguides. In yet another embodiment of the invention, each of the optical waveguides is formed with a narrow width portion and a wide width portion, with the narrow width portion of one of the waveguides being adjacent the wide width portion of a neighboring waveguide.

In yet another embodiment of the invention, each of the waveguides is formed having an equal total area of narrow and wide portions so as to maintain the transmission characteristics of each waveguide substantially equal.

From the foregoing it can be seen that it is a primary object of the present to provide on optical print head with increased writing speed.

It is a further object of the present invention to provide an optical fiber/waveguide print head which forms output beams having gaussian shapes which may differ in the vertical and horizontal directions.

Another object of the present invention is to minimize the cross-talk between optical elements of a multi-element optical print head.

These and other objects of the present invention will become more apparent when taken in conjunction with the following description and drawings wherein like characters indicate like parts and which drawings form a part of the present specification.

BRIEF DESCRIPTION OF THE DRAWINGS

FIG. 2 is a segmented view of the print head illustrating a number of optical waveguides each having a different width.

FIG. 3 illustrates a number of optical waveguides each having sections of different width that complement its neighbor in width and sections with the same width.

DESCRIPTION OF THE PREFERRED EMBODIMENTS

Figure 1:
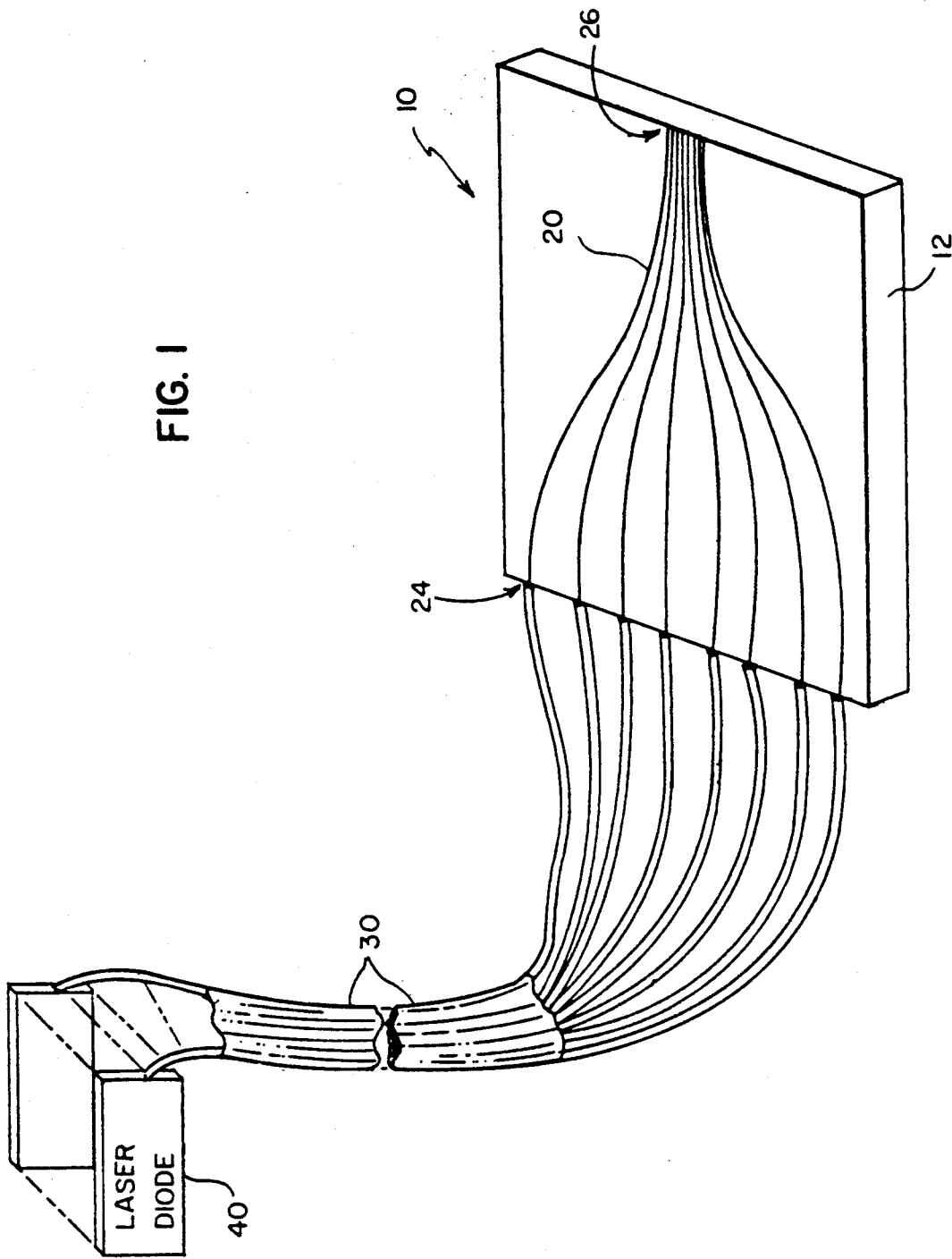
FIG. 1 is a plan view illustrating the fan-out pattern of the optical waveguides forming a part of an optical print head.

Referring to FIG. 1, wherein one embodiment of a print head 10 is illustrated connected to one end of a bundle of optical fibers 30. Each fiber in the bundle is connected at its opposite end to individual high intensity light sources 40, e.g. laser diodes. The print head 10 is formed from a block 12 of glass, LiNbO$_3$ or plastic into which a plurality of channel waveguides 20 are formed. The waveguides 20 are positioned closely together at a printing end 26 and thereafter fan apart to make the connection with the optical fibers 30 at an end labeled 24. The print head 10 functions by being scanned over the surface of a recording medium while the appropriate ones of the laser diodes 40 are energized so as to cause recording spots to appear on the recording medium.

In the preferred embodiment of the invention the spacing of the channel waveguides 20, at the printing end 26, is 0.00907 mm. The spacing at the other end 24 is 0.0900 mm. The distance between the two ends is 20 mm. Each end of an optical fiber is centered with respect to the end of an associated channel waveguide and is connected thereto by means of an adhesive. A suitable adhesive is supplied by the Norland Company under the name Norland 61. However, a preferred adhesive is Lamdek U V Adhesive, Catalog No. 177-6921, obtainable from Dymax Engineering Adhesives, a division of American Chemical and Engineering Company, Torrington, CT. Other means may be used to optically couple the optical fibers to the optical waveguides e.g. mounting the fibers in etched v-grooves in the material 12 which grooves are aligned with the center of an associated channel waveguide. The channel waveguides 20 may be formed of diffused areas of Ti and the block 12 may be formed from an X-cut of LiNbO$_3$ material, or other acceptable material. The channels in LiNbO$_3$ are formed photolithographically using approximately 300 to 400 angstroms of Ti that is diffused at approximately 1025 degrees C. for approximately 8 hours. Mg ions are diffused into the LiNbO$_3$ to decrease the refractive index at the waveguide surface. By proper adjustment of the amount of Mg that is deposited the waveguide's depth index may be symmetrised. One paper of interest for its teaching in this area is entitled "Titanium/Magnesium Double Diffusion Method for Efficient Fibre-LiNbO$_3$ Waveguide Coupling" by K. Komatsu Electronics Letters, 14th Aug. 1986, Vol. 22, No. 17, pgs. 881-882.

FIG. 2, illustrates, in detail, one preferred embodiment of the invention. The channel waveguides 20 are formed on the surface of the block 12 with widths that alternate so as to minimize the cross-coupling of light between two adjacent waveguides. As an example, the width of the channel waveguides 20A are selected to be 3 $\mu$m and the width of the channel waveguides 20B are selected to be 4 $\mu$m. It is to be recognized that other widths may be used and that it is only necessary that adjacent waveguides not have the same width when positioned in close proximity.

FIG. 3, illustrates a second embodiment of the invention wherein each of the channel waveguides 20 is formed with one section 20C of equal width and an equal length with it's neighbors. A second section of each waveguide, denoted 20D and 20E for alternate waveguides, is formed with different widths so as to minimize their cross-coupling. In the preferred embodiment of the invention the width of the sections 20C is 3.6 $\mu$m, the width of sections 20D is 4.0 $\mu$m, and the width of sections 20E is 3.2 $\mu$m. The spacing on centers, at the printing end 26, is 9 $\mu$m with the spacing at the receiving end 24 being 90 $\mu$m.

Figure 4:
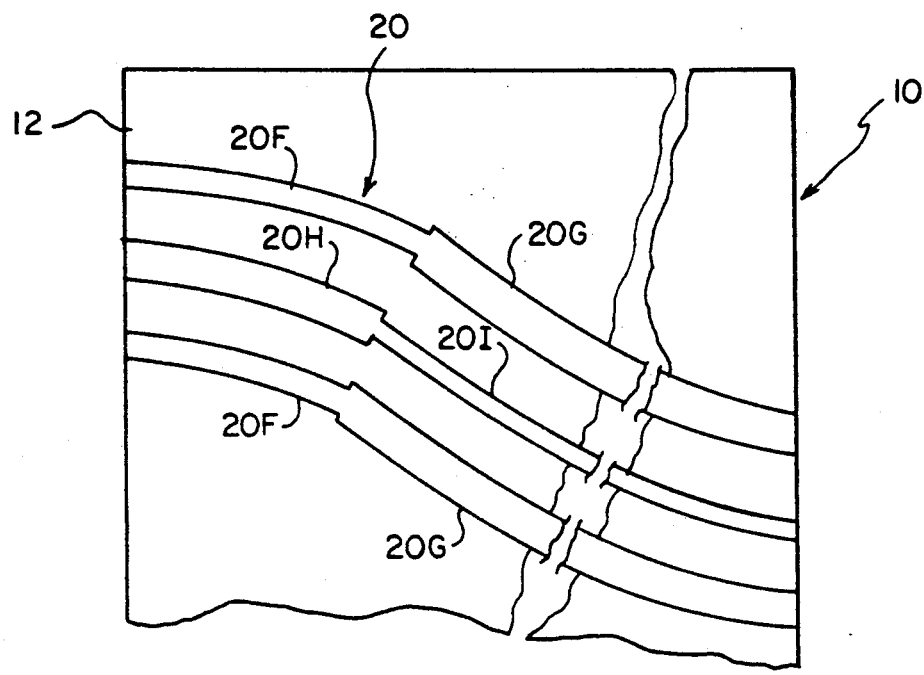
FIG. 4 illustrates a plurality of optical waveguides each having equal areas from end-to-end

Referring to FIG. 4, the print head 10 is formed with alternate ones of the waveguides 20 having a first section 20F which is narrow and a second section 20G which is wider. Intermediate to these waveguides are positioned waveguides having a wide section 20H and a narrower section 20I. The transitions between the widths is selected such that the total area of each of the channel waveguides is the same. By forming each of the waveguides with equal areas the light path for each of the waveguides is maintained substantially constant.

Figure 5:
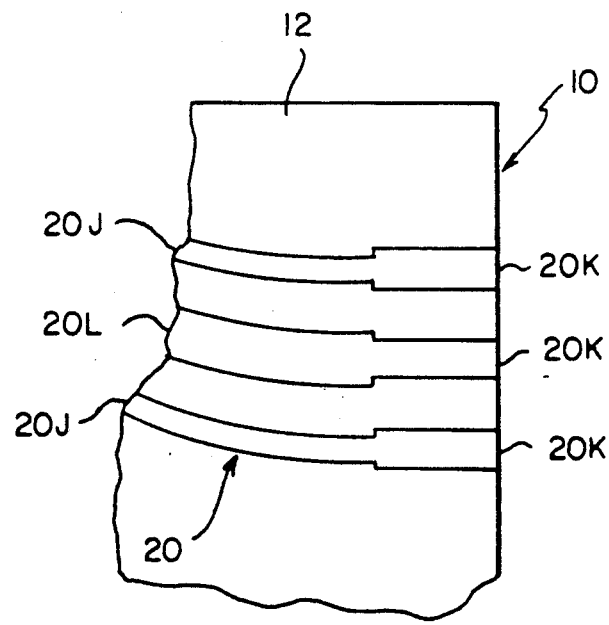
FIG. 5 illustrates the end termination area of a plurality of optical waveguides each having the same width only in the area of the termination.

In FIG. 5 each of the waveguides 20 is provided with an equal width termination section 20K irrespective of the remainder of its width. For example, sections 20J and 20L are shown with widths that are smaller than and greater than the width of section 20K, respectively. This provides a degree of uniformity in the light pattern emitted from the ends of the channel waveguides.

In summary, in order to reduce the cross coupling between channel waveguides the widths of adjacent waveguides are made non-alike. In order to increase the symmetry of the output light intensity from a channel waveguide a layer of MgO is deposited over the waveguide.

While there has been shown what are considered to be the preferred embodiments of the present invention it will be manifest, to a person skilled in the art, that many variations of the present invention may be had in light of Applicant's teachings without departing from the essential spirit of the invention. It is intended, therefore, in the annexed claims, to cover all such changes and modifications as may fall within the true scope of the invention.

What is claimed is:

1. A multichannel waveguide print head comprising:
   a substrate;
   a plurality of optical waveguides formed in a fan pattern, having a narrow end and a wide end, on a surface of said substrate, with each of said plurality of waveguides having a width different from its adjacent neighbor;
   a plurality of optical fibers, each having a first end and a second end, with said first end coupled to an associated one of said optical waveguides adjacent the wide end of said fan pattern; and
   a plurality of light sources each coupled to an associated one of said plurality of optical fibers at said second end, whereby light from said light sources causes a printing on a medium when the narrow end of the fan pattern is adjacent to the medium.

2. The multichannel waveguide print head according to claim 1 wherein each of said plurality of optical waveguides has a wide section and a narrow section.

3. The multichannel waveguide print head according to claim 2 wherein the sections of each optical waveguide adjacent the wide end of said pattern have the same width.

4. The multichannel waveguide print head according to claim 2 wherein the wide and narrow sections of each optical waveguide is positioned adjacent the narrow and wide sections of its neighbors, respectfully.

5. The multichannel waveguide print head according to claim 1 wherein each of said optical waveguides at the narrow end of said fan pattern is formed with a section of equal width.

6. The multichannel waveguide print head according to claim 1 wherein said substrate is formed from LiNbO$_3$, said optical waveguides are formed from a diffusion of Ti, and further comprising, a layer of MgO positioned over said Ti to form the light emitted from the ends of each optical waveguide, adjacent the narrow end of said fan pattern, into a symmetrical beam of light.

* * * * *